Feb. 13, 1940.  R. A. MacDONALD  2,190,174
LOCK NUT
Filed Aug. 6, 1938

INVENTOR
Robert G. MacDonald
BY
Pennie Davis Marvin & Edmonds
ATTORNEYS

Patented Feb. 13, 1940

2,190,174

UNITED STATES PATENT OFFICE 2,190,174

LOCK NUT

Robert A. MacDonald, Greenwich, Conn., assignor to Russell, Burdsall & Ward Bolt & Nut Company, Port Chester, N. Y., a corporation of New York Application August 6, 1938, Serial No. 223,387

2 Claims. (Cl. 151—22)

This invention relates to lock nuts and more particularly to a lock nut having several threads of special design which will engage the threads of the bolt with sufficient friction to prevent accidental or unintentional loosening of the nut.

I am aware of several prior proposals for producing a lock nut by means of one or more special locking threads. These suggestions, however, have all been open to one of several objections. In some of the proposed lock nuts several tapping operations are necessary in threading the nut and this adds to the cost of the product. In others of the proposals the locking threads are of such design that the threads of the bolt are deformed when the nut is tightened and the nut either can not be removed or the bolt can not be reused.

In carrying out the present invention I take a blank with a central opening having a portion of smaller diameter than the remainder. The blank is threaded and the locking threads produced in a single threading operation. For this purpose I use an undercut tap in which the the diameter of the undercut portion of the tap is equal to the diameter of the small portion of the nut opening. In the portion of the nut blank of larger diameter, the tap produces a normal thread which may be either the standard U. S. thread or a V type thread. In the small portion of the nut blank opening the additional metal present enters into the undercut portion of the threads of the tap and forms extensions which produce the locking threads. When this nut is threaded on a bolt, the locking threads, or the extensions formed thereon, engage the bottom of the threads of the bolt to lock the nut in position.

A lock nut so produced has several advantages. In the first place it is formed by a single tapping operation and therefore is no more expensive to produce than the standard form of nut. The locking threads so formed do not deform the threads of the bolt when the nut is applied and it can therefore be removed by means of a wrench and the bolt reused. The extensions can be of any size giving the desired friction for locking the nut to the bolt. At the same time a nut so threaded produces a construction which will effectively lock the nut to the bolt and prevent its accidental or unintentional removal.

In the accompanying drawing I have shown several forms of the invention. In this showing:

In forming the lock nut of the present invention I employ a blank 1 having a central opening, a portion 2 of which is of larger diameter than the remaining portion 3. Such a blank may be produced in a single punching operation at no greater expense than the cost of producing a blank having an opening of uniform diameter. For this purpose a special punch is used having a reduced portion that is adapted to form the smaller portion 3 of the central opening.

Figure 1:
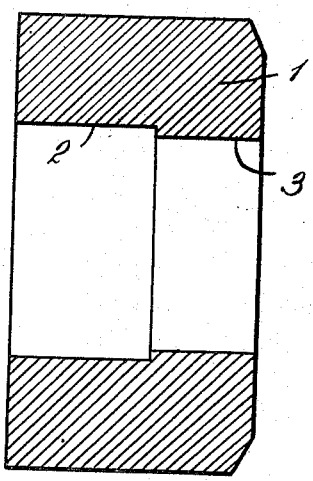
Fig. 1 is a cross-sectional view of the blank from which the nut is formed.
Figure 2:
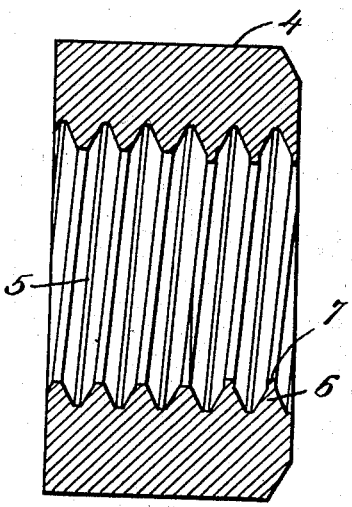
Fig. 2 is a similar view showing one form of locking thread.
Figure 3:
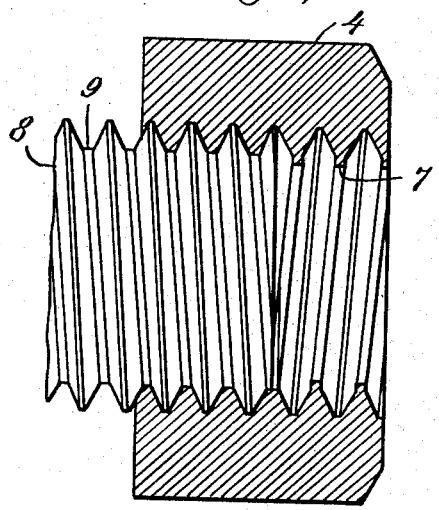
Fig. 3 is a similar view showing the nut of Fig. 2 being applied to a bolt.

By employing a blank of the form shown in Fig. 1 and tapping it with a special tap I produce the nut 4 shown in Fig. 2 of the drawing which is provided with normal U. S. threads 5 at one end and with one or more locking threads 6 at the opposite end. The locking threads 6 as shown are of the same pitch and same angle as the normal threads and are of the same diameter at their roots, but have surplus material 7 at the crest of each thread forming extensions which frictionally engage in the bottom of the threads of the bolt, when the nut is in position, and form an effective locking means. An end of a bolt 8 is shown in Fig. 3 of the drawing arranged in the nut 4. The threads 5 of the nut are of proper size to be engaged by the threads of the bolt 8 and the nut may therefore be tightened on the bolt to the point indicated at Fig. 3 of the drawing by hand. Further tightening must then be done with a wrench and the extensions 7 of the locking threads 6 engage the bottoms 9 of the threads of the bolt to sufficiently tighten the nut to prevent its removal by vibration and the like. The extensions may be made of any size by variation of the difference in diameter of the portions 2 and 3 of the unthreaded nut opening and thus may be made to engage the bottom of the bolt threads with any desired amount of friction. I preferably make these extensions of such size that the nut must be tightened with a wrench but in which the engagement is such that the nut may be removed by means of a wrench without deforming the threads of the bolt, thereby permitting the bolt to be reused.

The special tap by means of which the normal threads 5 and the locking threads 6 are formed in a single tapping operation, forms the subject matter of my U. S. Patent No. 2,179,157 issued November 7, 1939. A tap of the proper diameter and with threads of the proper size to cut the normal threads 5 is employed and this tap is under-cut at the base of its threads to provide space to receive the additional metal at the top of each thread when the tap passes through the reduced portion 3 of the nut blank. This forms the extensions 7 at the top of the nut threads. The nuts may therefore be threaded in a continuous tapping operation in which the nuts pass on to one end of the tap and are removed from the other end. The lock-nut may therefore be made at no greater expense than the expense of producing an ordinary nut.

Figure 4:
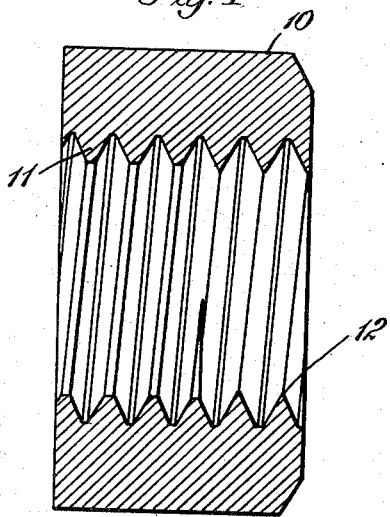
Fig. 4 is a similar view showing another form of locking thread.

The nut 10 shown in Fig. 4 of the drawing represents another form of the invention in which normal threads 11 are provided at one end and locking threads 12 at the other end. This form differs from that shown in Figs. 2 and 3 of the drawing in the shape of the extensions. By under-cutting the tap with a pointed under-cut of triangular cross-section instead of an under-cut of rectangular cross section, the extensions are pointed as shown at the right of Fig. 4. The nut of Fig. 4 is employed in the same way as the nut of Figs. 2 and 3. It may be threaded on to the bolt by hand until the bolt reaches the end of the portion of the nut provided with normal threads 11. Further threading of the nut must be done with a wrench and the extensions 12 then frictionally engage the bottoms 9 of the bolt threads locking the nut in position.

I claim:

1. A lock nut provided with normal threads throughout a portion of its central opening and being provided with locking threads adjacent one end thereof, the body of the locking threads being of the same pitch and same angle as the normal threads and being of the same diameter at their roots and being provided with extensions at their crests.

2. A lock nut provided with normal threads throughout a portion of its central opening and being provided with locking threads adjacent one end thereof, the body of the locking threads at their bases being of the same width and diameter as the normal threads and the locking threads being of the same angle as the normal threads, said locking threads being provided with extensions at their crests.

ROBERT A. MacDONALD.